(12) United States Patent
Arisaka

(10) Patent No.: US 6,578,833 B2
(45) Date of Patent: Jun. 17, 2003

(54) STRING PULL-IN DEVICE

(75) Inventor: Oomi Arisaka, Chigasaki (JP)

(73) Assignee: Piolax, Inc., Kanagawa (JP)

( * ) Notice: Subject to any disclaimer, the term of this patent is extended or adjusted under 35 U.S.C. 154(b) by 0 days.

(21) Appl. No.: 09/913,051

(22) PCT Filed: Dec. 8, 2000

(86) PCT No.: PCT/JP00/08686

§ 371 (c)(1),
(2), (4) Date: Aug. 9, 2001

(87) PCT Pub. No.: WO01/42049

PCT Pub. Date: Jun. 14, 2001

(65) Prior Publication Data

US 2002/0158382 A1 Oct. 31, 2002

(30) Foreign Application Priority Data

Dec. 10, 1999 (JP) ............................................. 11-351019

(51) Int. Cl.$^7$ .................................................. F16F 1/00
(52) U.S. Cl. .............................. 267/71; 267/226; 296/76
(58) Field of Search ............................ 188/266; 296/76, 296/37.1, 37.5; 108/44; 267/69, 70, 71, 72, 73, 74, 226, 34

(56) References Cited

U.S. PATENT DOCUMENTS

| | | | | |
|---|---|---|---|---|
| 4,357,046 A | * | 11/1982 | Lalanne ........................ | 224/542 |
| 4,648,648 A | * | 3/1987 | Shigesada et al. ........ | 296/37.16 |
| 4,728,141 A | * | 3/1988 | Motozawa et al. ........ | 242/373 |
| 5,333,845 A | * | 8/1994 | Seiichi ........................ | 267/70 |
| 6,220,583 B1 | * | 4/2001 | Ito .............................. | 267/226 |
| 6,367,785 B1 | * | 4/2002 | Nakabayashi et al. ..... | 267/226 |

FOREIGN PATENT DOCUMENTS

| | | |
|---|---|---|
| JP | 57-194165 | 11/1982 |
| JP | 2000-211434 | 8/2000 |

OTHER PUBLICATIONS

Microfilm of the specification and drawings annexed to the request of Japanese Utility Model application No. 116264/1988 (Laid–open No. 38246/1990) (Nissan Motor Co., Ltd.), Mar. 14, 1990.
Microfilm of the specification and drawings annexed to the request of Japanese Utility Model Application No. 131792/1985 (Laid–open No. 38742/1987) (Mitsubishi Motors Corporation), Mar. 7, 1987.

* cited by examiner

*Primary Examiner*—Pam Rodriguez
(74) *Attorney, Agent, or Firm*—Wenderoth, Lind & Ponack, L.L.P.

(57) ABSTRACT

A pull-in device for a string includes a tubular cylinder, a piston adapted to move inside the cylinder, an urging spring for elastically urging the piston inside the cylinder in the direction of one terminal part of the cylinder, and a string to be pulled in or pulled out with the movement of the piston. The device is characterized by a plurality of hooking parts, each capable of slidably hooking the string, that are formed on the piston as mutually opposed across the center of the piston, a hooking part capable of slidably hooking the string that is formed on a cap adapted to close the other terminal opening part of the cylinder, one terminal part of the string pulled out of the cylinder, intervening points of the whole length of the string hooked serially on the hooking parts and as folded back, and the other terminal part of the string fixed on the cylinder or piston.

11 Claims, 18 Drawing Sheets

STRING PULL-IN DEVICE

TECHNICAL FIELD

This invention relates to a pull-in device for imparting a vertical reciprocation through a string to a rear shelf disposed on a rear receiving compartment side as interlocked with a make-and-break action of a tailgate of a hatchback car, for example.

BACKGROUND ART

The invention disclosed in JP-A-SHO 57-194165 concerns one of the conventional pull-in devices of this class.

This conventional pull-in device, as illustrated in FIG. 2 through FIG. 4 of this disclosure, is constructed by providing opposite sides on a rear face of a rear shelf with a pair of cover members. Inside each of the cover members is disposed an elastic member having one terminal part thereof fixed on the cover member side. One terminal part of a flexible member is connected to the other terminal part of the elastic member, and the other terminal part of the flexible member is fitted on the tailgate side of a hatchback car.

In the conventional pull-in device, when the tailgate of the hatchback car is opened, the rear terminal part side of the rear shelf disposed in the rear receiving compartment is moved upward by the tensile force of the flexible member to permit the baggage to be moved in or out of the rear receiving compartment. Conversely, when the tailgate is closed, the rear shelf moves downward under its own weight and resumes the original horizontal state. At this time, the presence of the flexible member causes no obstruction because the flexible member is pulled into the interior of the cover member by the elastic force of the elastic member.

The conventional pull-in device, therefore, provides an advantage in enabling the rear shelf to be automatically reciprocated vertically as interlocked with the closing and opening motion of the tailgate. On the other hand, it provides a disadvantage in requiring the cover member to be unduly elongated for the purpose of imparting an ample length to the flexible member and causing it to be automatically enlarged in the direction of the length thereof.

This invention has been developed with a view to effectively solve the problem entailed by the conventional pull-in device as described above.

SUMMARY OF THE INVENTION

This invention relates to a pull-in device for a string, which comprises a tubular cylinder, a piston adapted to move inside the cylinder, an urging spring for elastically urging the piston inside the cylinder in the direction of one terminal part thereof, and a string to be pulled in or pulled out in consequence of the movement of the piston. In this pull-in device, a plurality of hooking parts, each capable of slidably hooking the string, are formed on the piston mutually opposed across the center of the piston, and a hooking part capable of slidably hooking the string is formed on a cap adapted to close the other terminal opening part of the cylinder. One terminal part of the string can be pulled out of the cylinder and meanwhile, the intervening points of the whole length of the string can be hooked serially on the hooking parts as folded back, and the other terminal part of the string can be fixed on the cylinder or piston. As a consequence of this procedure, the string can be given a far greater length than the length of the cylinder and the pull-in device itself can be miniaturized to a great extent. Since the hooking parts on the piston side are formed mutually opposed across the center of the piston, the piston can be smoothly moved inside the cylinder without producing any rattling motion.

The pull-in device of this invention is provided between the cylinder and the piston with a rotation-preventing means capable of preventing the piston from being rotated inside the cylinder. As a result, the string hooked on the piston side inside the cylinder can be prevented from entangling.

This invention contemplates allowing the piston to deform elastically and go through the inside of the urging spring and force its way under the spring seat of the urging spring disposed on one terminal part side of the cylinder. During the assembly of the device, by enabling the piston to go through the whole route thereof after the urging spring has been inserted into the cylinder, it is made possible to advance the piston to below the spring seat of the urging spring disposed on one terminal part side of the cylinder. As a result, it is possible to enhance the overall ease of the assembly of the device.

This invention contemplates defining a sealed chamber between one terminal part of the cylinder and the piston and providing the sealed chamber with a valve having a directional property such that the valve permits air to flow in when the piston has moved in the direction of the other terminal opening part of the cylinder and restricts the inflow of the air when the piston has moved in the direction of one terminal part of the cylinder. As a consequence of this contrivance, the string, when pulled in freely, is prevented from rattling vigorously around.

This invention contemplates providing the piston with an orifice such that when one terminal part of the string is to be pulled in freely, the greatest speed of the movement of the string is kept from exceeding 1.6 m/sec. The string cannot be pulled in at an unduly high speed because a braking force is exerted on the speed of movement of the string as a consequence of the contrivance.

This invention contemplates providing one terminal part of the urging spring with a means for preventing the piston from being rotated and the other terminal part thereof with a means for preventing the cylinder from being rotated. In consequence of this contrivance, the string hooked on the piston is prevented from entangling.

BEST MODE OF EMBODYING THE INVENTION

Figure 1:
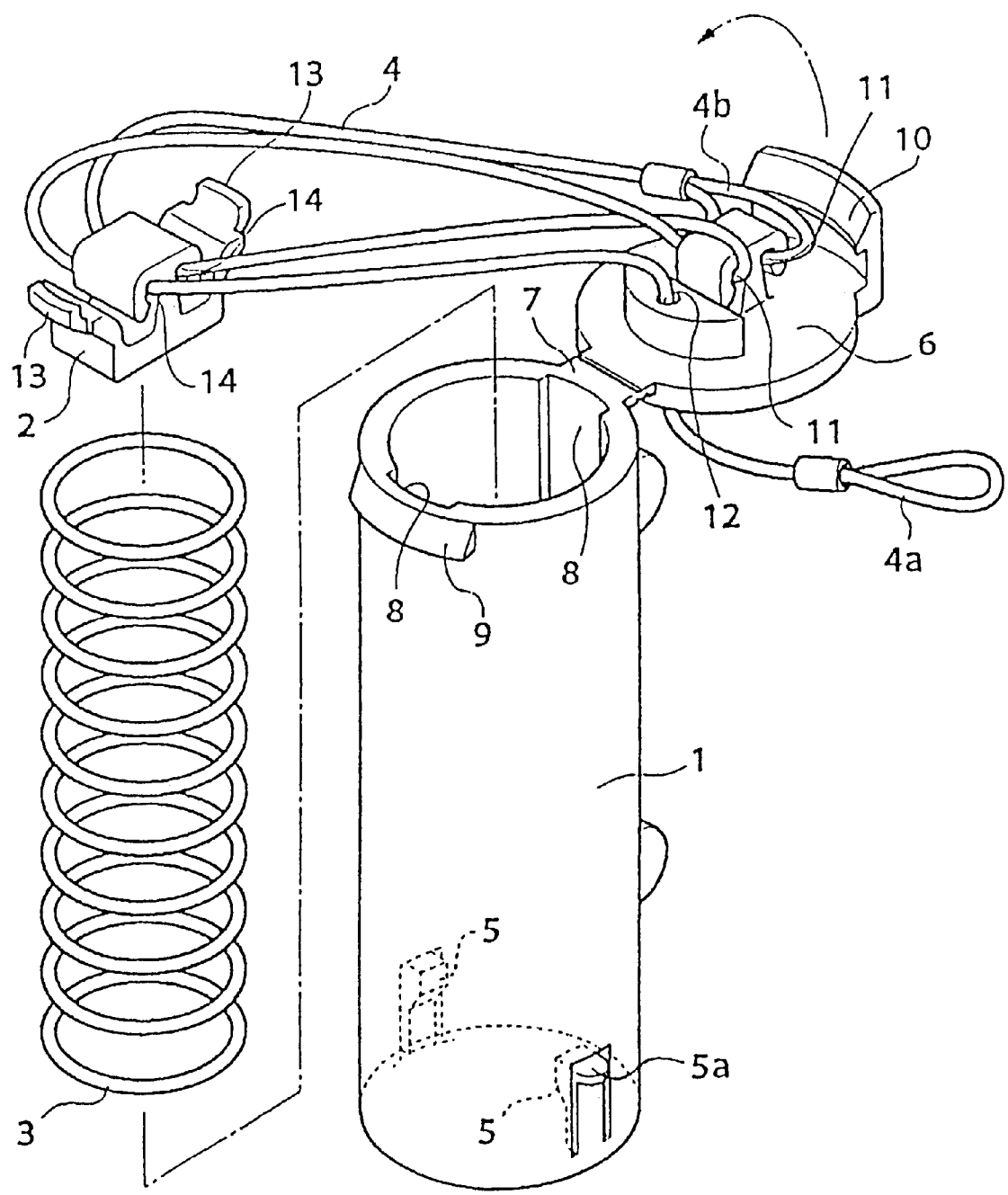
FIG. 1 is an exploded perspective view illustrating the pull-in device for a string according to the first embodiment of this invention.

This invention will be described in detail with the aid of the various illustrated modes of preferably embodying this invention. The pull-in device for a string according to the first embodiment has been developed as a pull-in device for imparting a vertical reciprocation to a rear shelf disposed on a rear receiving chamber as interlocked with the closing motion of a tailgate of a hatchback car. As illustrated in FIG. 1, the basic structure of this device comprises a tubular cylinder 1, a piston 2 adapted to move inside the cylinder 1, a compression coil spring 3 that serves as an urging spring for elastically urging the piston 2 inside the cylinder 1 in the direction of one terminal part of the cylinder 1, and a string 4 adapted to be pulled into the interior of the cylinder 1 or pulled out of the cylinder 1 as a consequence of the movement of the piston 2.

Then, the cylinder 1 is constructed, as illustrated in the diagram, in a tubular shape closed on one terminal part and opened on the other terminal part thereof The cylinder 1 is provided at opposite points on the one terminal part with spring seats 5 capable of releasing the compression coil spring 3. The cylinder 1 is further provided along an edge of an opening on the other terminal part with a cap 6 adapted to close the opening of the other terminal part and connected integrally to the edge through a thin-wall hinge 7. The cylinder 1 is further provided on the opposite inner surfaces thereof in the direction of its length with a pair of oblong depressed grooves 8 adapted to non-rotatably join elastic arms 13 of the piston 2 which will be described specifically herein below.

Incidentally, the spring seats 5 are thrust into the interior of the cylinder 1 and intended to support the terminal of the compression coil spring 3. The spring 3 is constructed so as to obtain release from the cylinder 1 by pulling an operating piece 5a projected from the outer surface of the cylinder 1 and cutting it off at the root part thereof. Then, the cap 6 is provided on the peripheral edge thereof with an engaging claw 10 adapted to be meshed with a receiving claw 9 on the cylinder 1 side. The cap 6 is further provided in the central part thereof with two hooking parts 11 that are adapted to slidably hook the string 4 and that are formed through a T-shaped block wall. The cap 6 is further provided at a position displaced from the center with a through hole 12 for leading one terminal part 4a of the string 4 out of the cylinder 1.

The piston 2 assumes a rectangular shape as illustrated in the diagram and is provided on the opposite edges thereof with the pair of elastic arms 13 adapted to move along the oblong grooves 8 and raised at a stated angle of inclination. The piston 2 is further provided on opposite sides across the center with two hooking parts 14 that are adapted to slidably hook the string 4 and that are formed through a T-shaped block wall.

Figure 2:
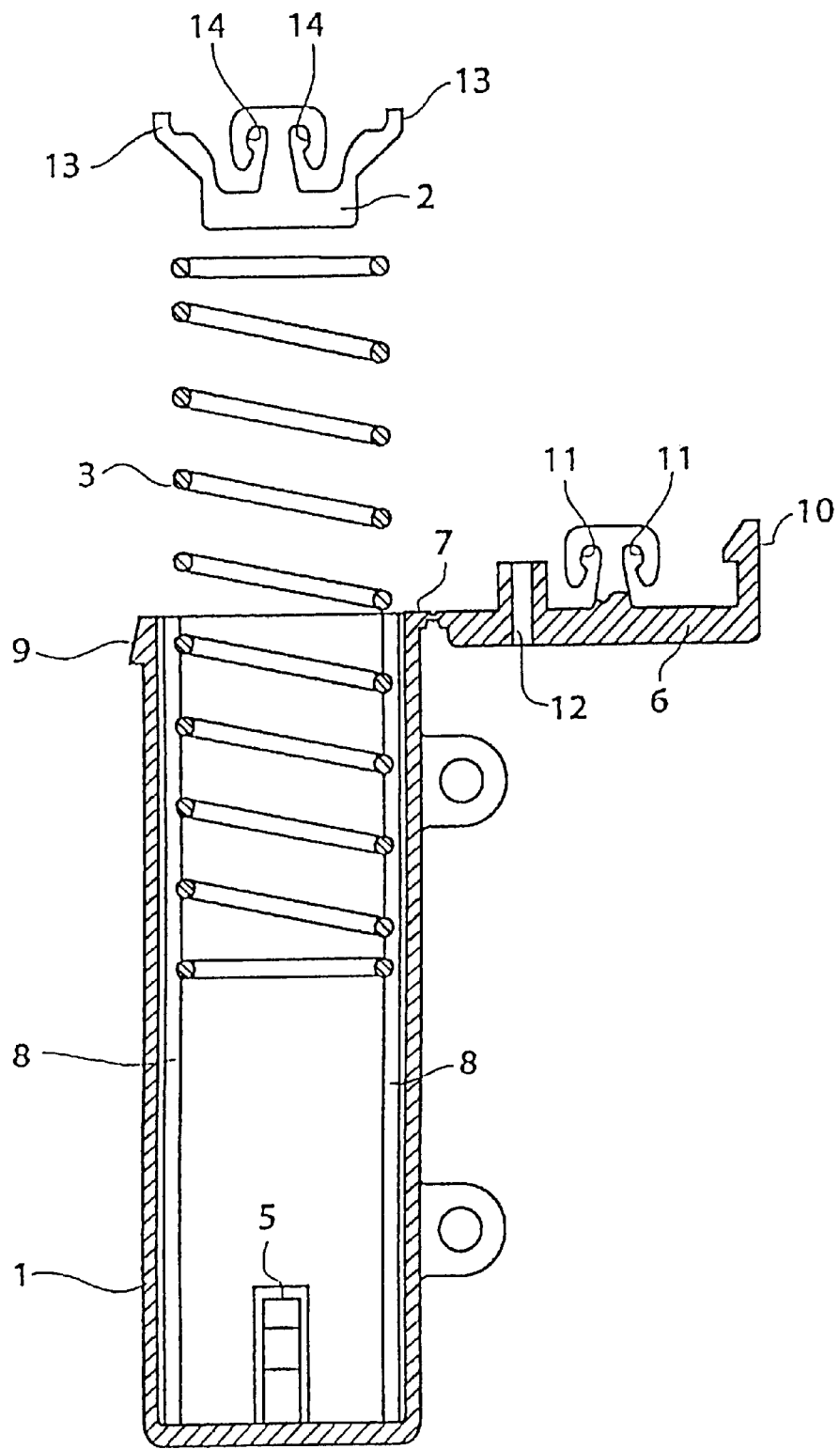
FIG. 2 is a cross section illustrating the state of a compression coil spring being inserted into the interior of a cylinder.
Figure 3:
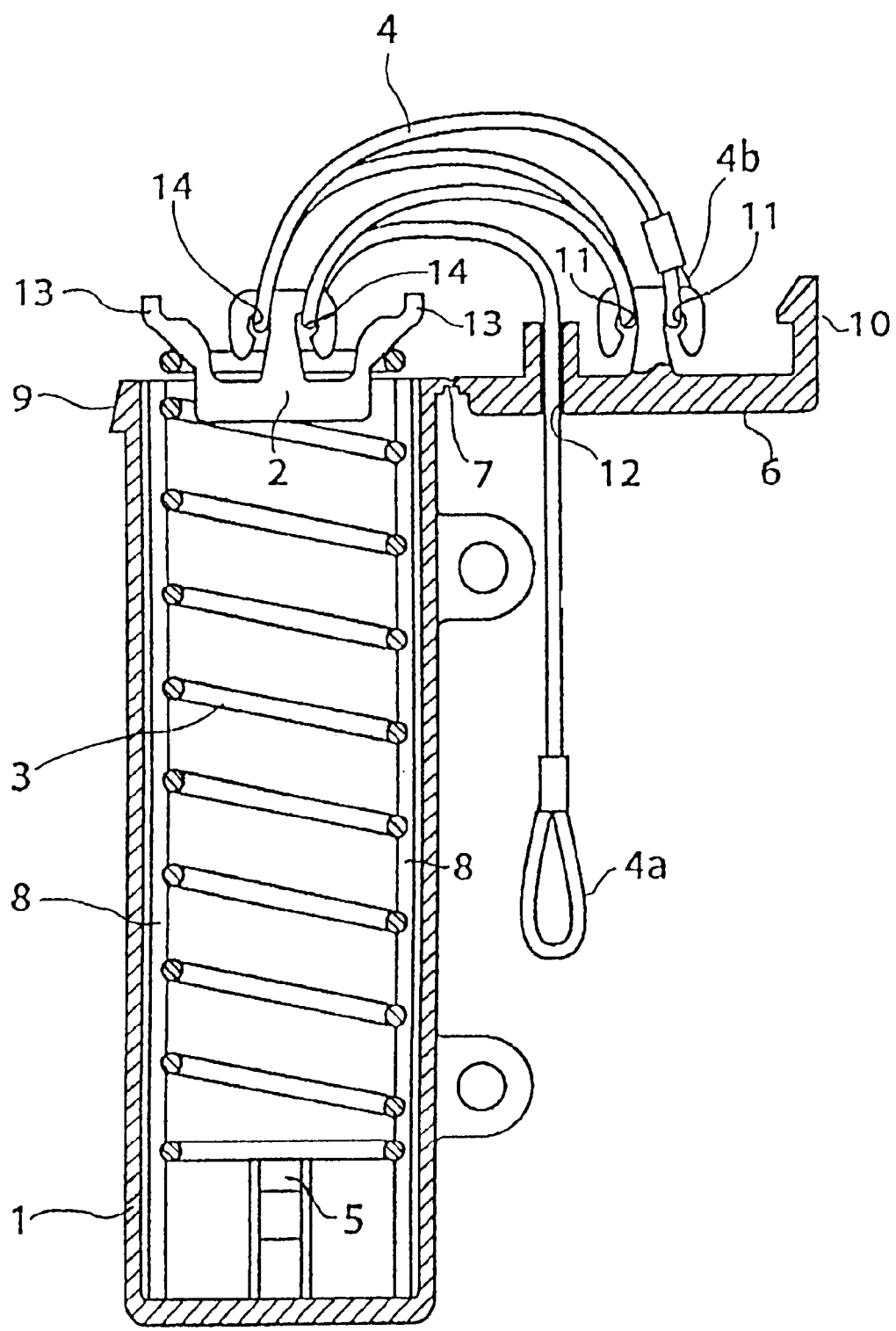
FIG. 3 is a cross section illustrating the state of a piston being inserted into the interior of the cylinder.
Figure 4:
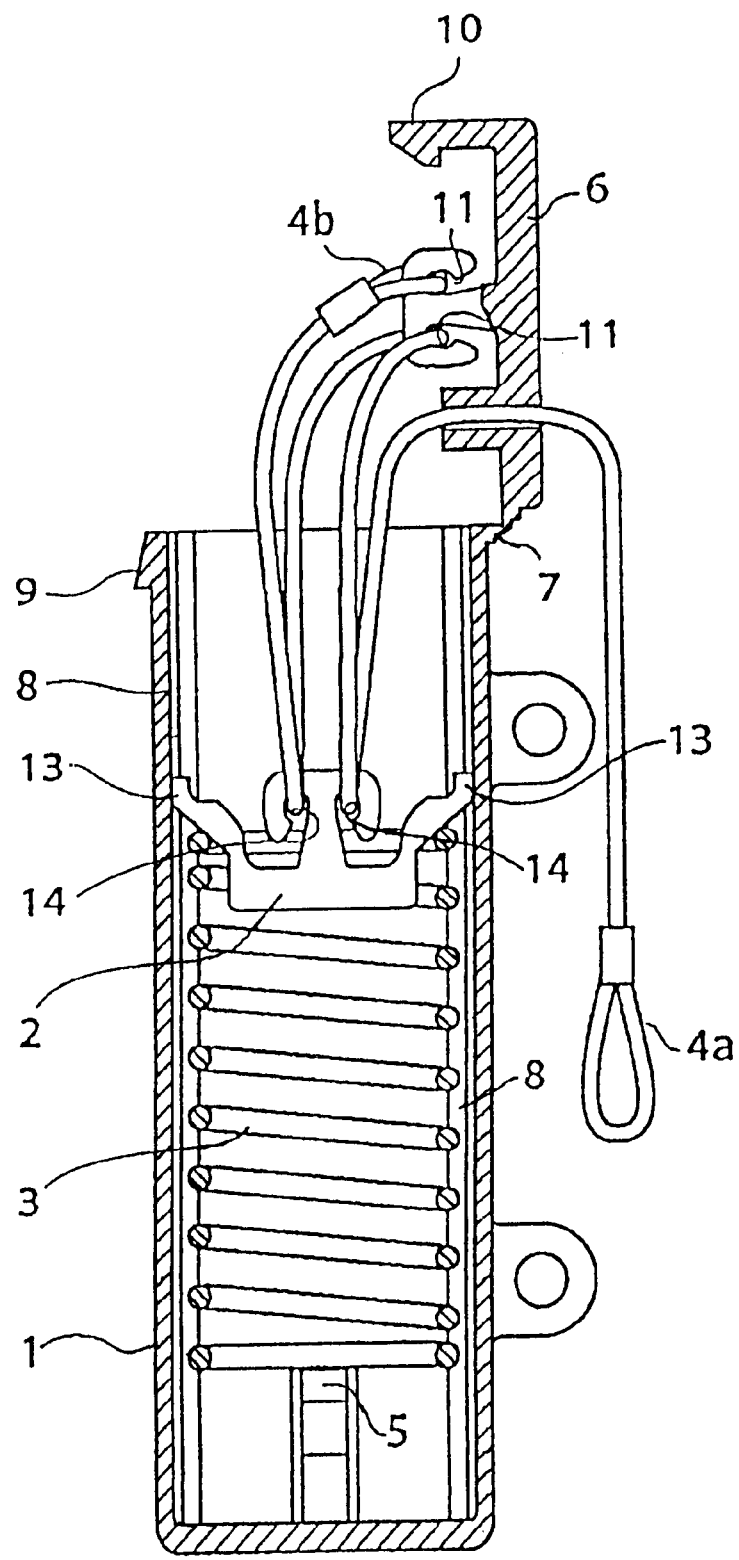
FIG. 4 is a cross section illustrating the state of the piston being driven into the interior of the cylinder.

Therefore, the pull-in device is assembled by first inserting the compression coil spring 3 into the interior of the cylinder 1 as illustrated in FIG. 2. As a result, the terminal of the compression coil spring 3 is supported by the pair of spring seats 5 disposed on the one terminal part of the cylinder 1 as illustrated in FIG. 3. The one terminal part 4a of the string 4 is then inserted through the through hole 12 of the cap 6 and led thereout and meanwhile the string 4 is successively folded back at the intervening points thereof (i.e. in a back and forth fashion). The folds are hooked on the hooking parts 11 of the cap 6 and the hooking parts 14 of the piston 2, thereby hooking the other terminal part 4b of the string 4 on one of the hooking parts 11 of the cap 6. The piston 2 is subsequently driven into the interior of the cylinder 1, meanwhile imparting compression to the compression coil spring 3 as illustrated in FIG. 4.

Figure 5:
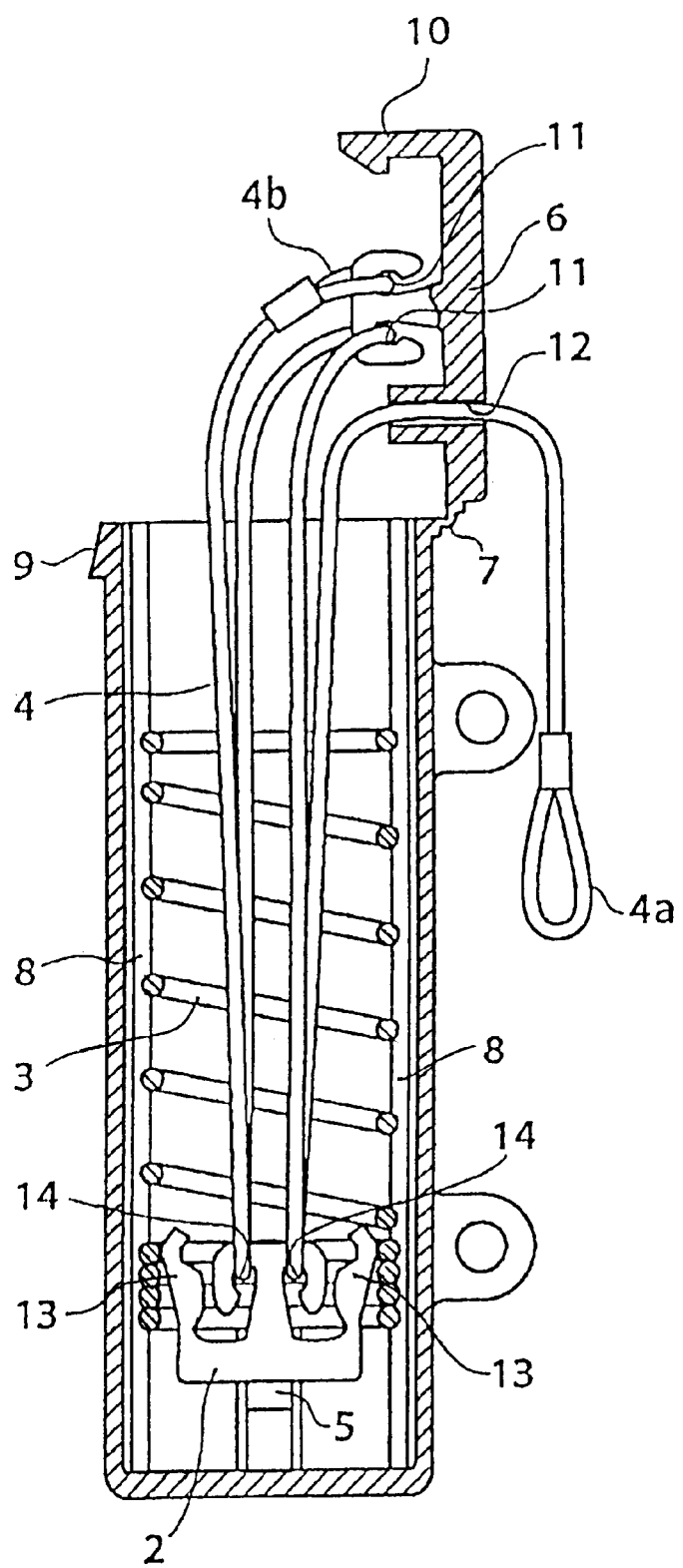
FIG. 5 is a cross section illustrating the state that the piston assumes immediately before going through the inside of the compression coil spring.
Figure 6:
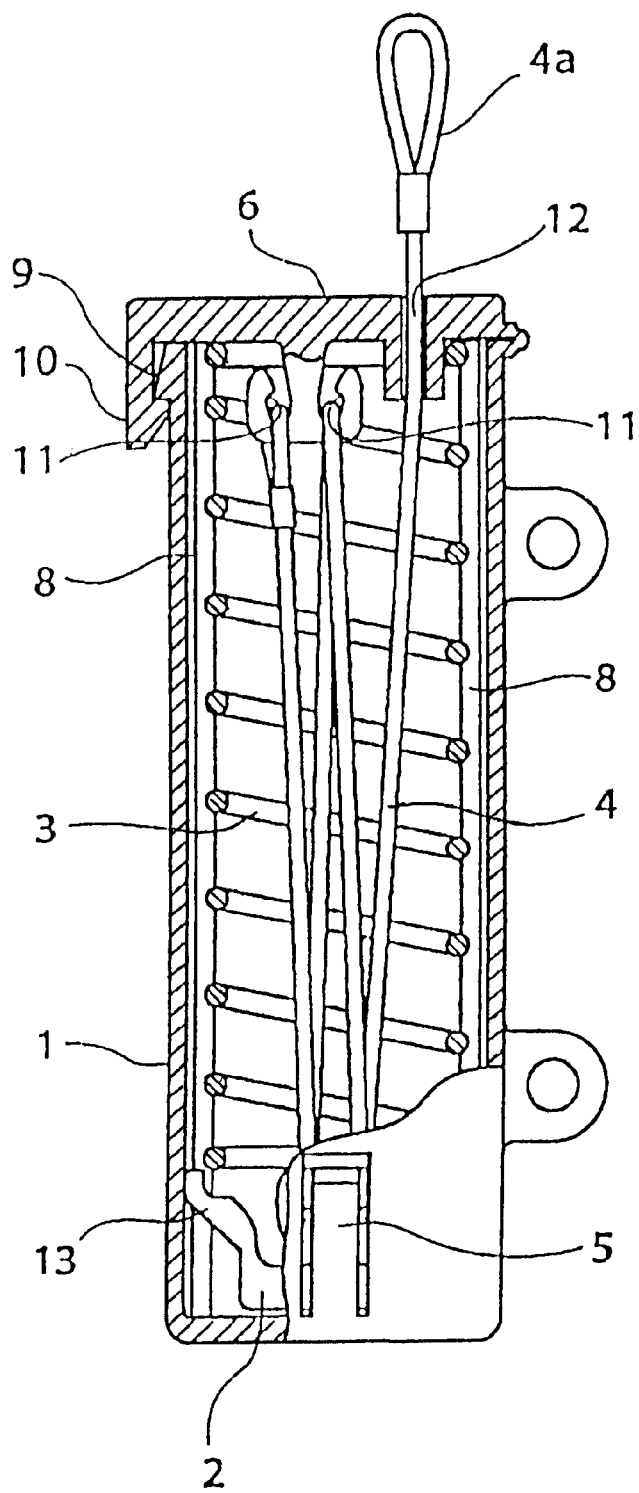
FIG. 6 is a cross section illustrating the state that the piston assumes after going through the inside of the compression coil spring

When the piston 2 is driven further into the interior of the cylinder 1 as illustrated in FIG. 5, the pair of elastic arms 13 bend inwardly and slip through the inside of the compression coil spring 3. As a result, as shown in FIG. 6, the arms force their way below the spring seats 5. In the ensuant state, however, the individual elastic arms 13 of the piston 2 are meshed with the corresponding oblong grooves 8, but have not yet contacted the terminal of the compression coil spring 3 as illustrated in the diagram. Also, at this time, the cap 6 closes the other terminal opening part of the cylinder 1 by rotating itself via the thin-wall hinge 7 and causing the engaging claw 10 to be meshed with the receiving claw 9 of the cylinder 1.

Figure 7:
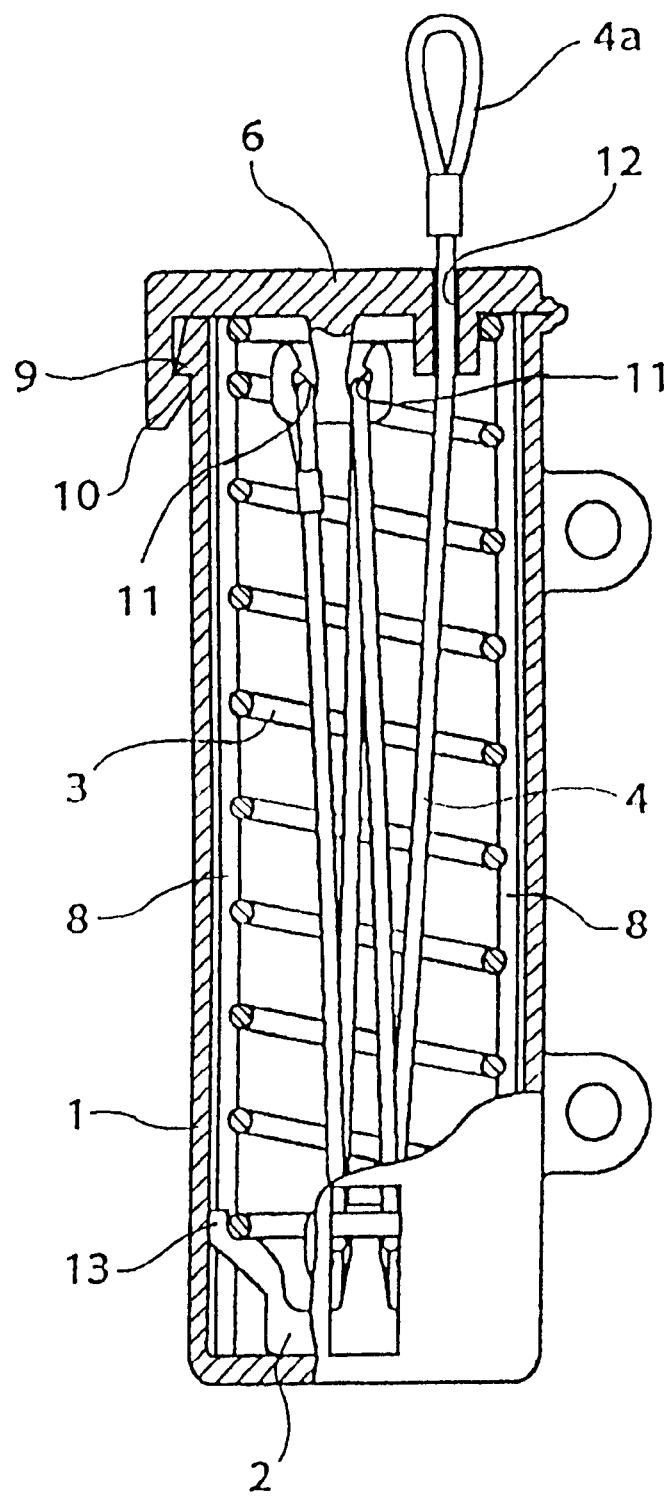
FIG. 7 is a cross section illustrating the state that the piston assumes after the terminal end of the compression coil spring has come into contact with an elastic arm of the piston.
Figure 8:
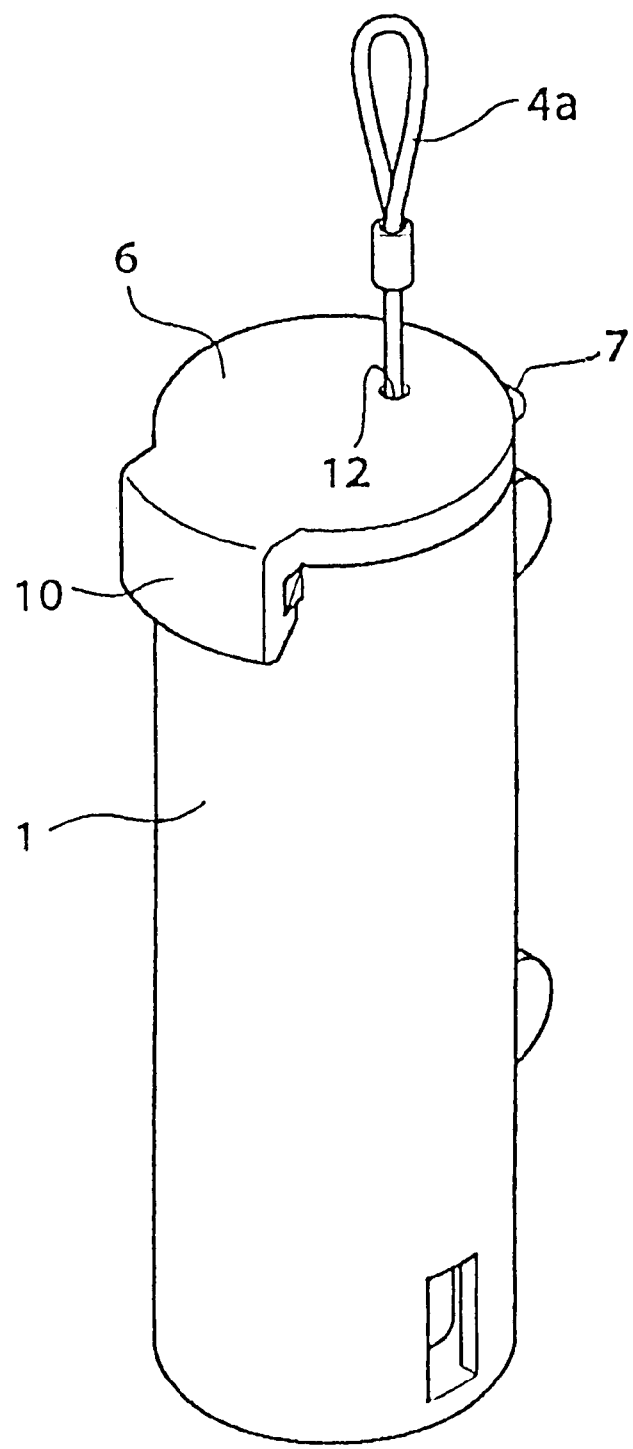
FIG. 8 is a perspective view illustrating the state that the pull-in device assumes after it has been assembled.

When the individual spring seats 5 are finally removed from the cylinder 1 in accordance with the procedure described above, the terminal of the compression coil spring 3 descends and contacts the individual elastic arms 13 of the piston 2 as illustrated in FIG. 7. As a consequence thereof, the pull-in device is simply assembled as illustrated also in FIG. 8. At the positions from which the spring seats 5 have been removed, hollow parts each shaped like an angular hole are formed.

Figure 9:
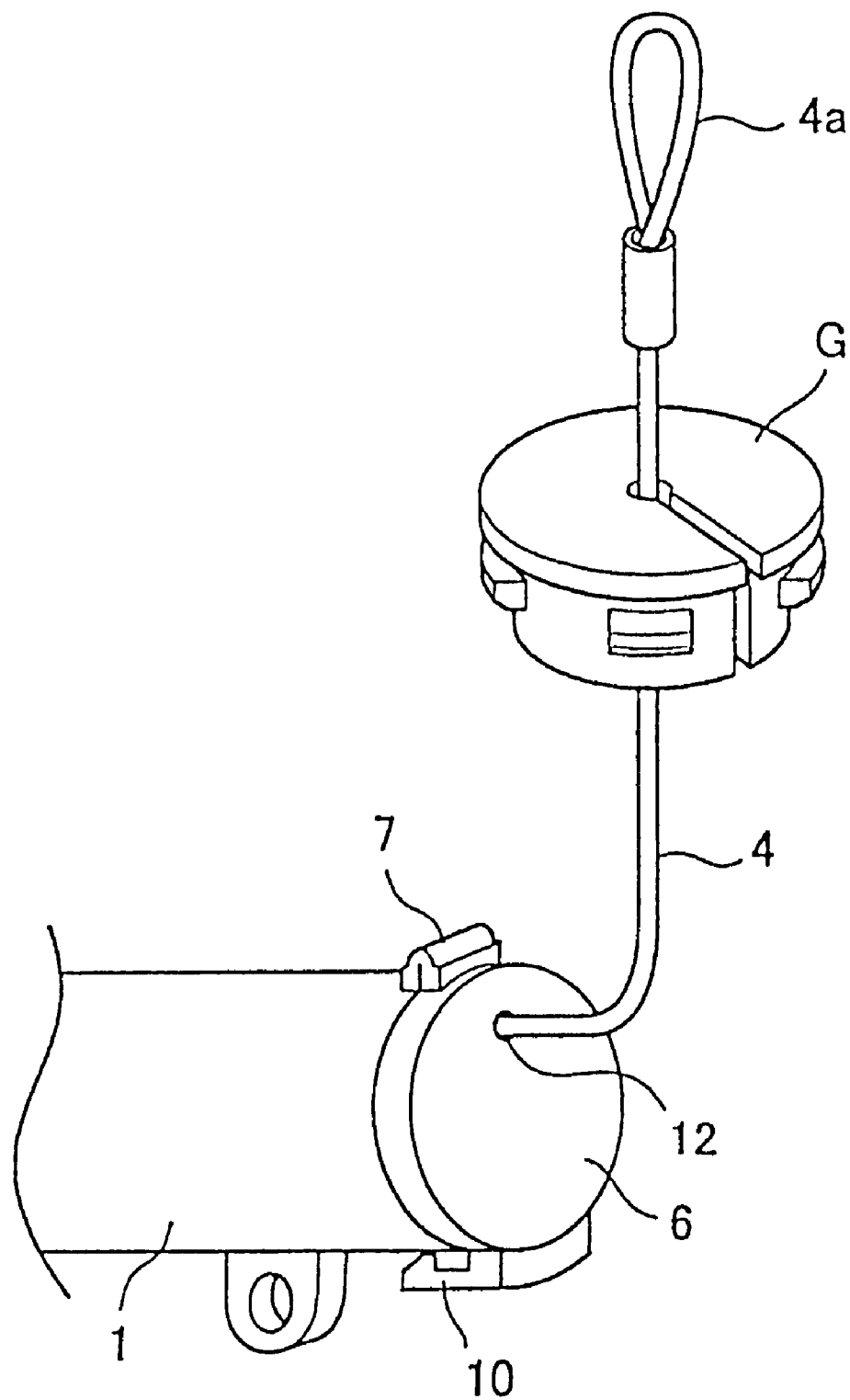
FIG. 9 is a perspective view of the essential part illustrating the state that the device assumes after a grommet has been set in place on one terminal part side of the string.
Figure 10:
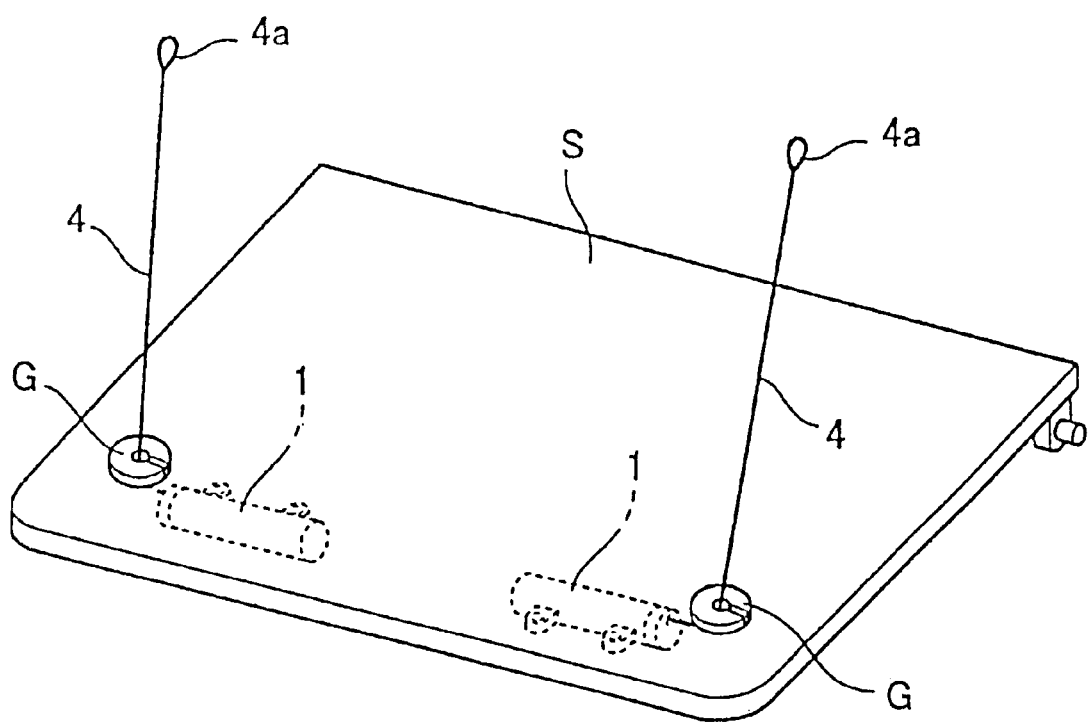
FIG. 10 is an explanatory diagram illustrating the state that a rear shelf assumes after the cylinder has been fixed to the opposite sides of the rear surface.

The one terminal part 4a of the string 4 is pulled out of the cylinder 1 to a certain extent as shown in FIG. 9. As a result, a grommet G fastened to the fitting hole of a rear shelf S is fastened on the one terminal part 4a of the string 4. The cylinder 1 is then fixed to the opposite sides on the rear surface of the rear shelf S as illustrated in FIG. 10. Consequently, vertical reciprocation of the rear shelf S in the pull-in device is initiated.

Figure 11:
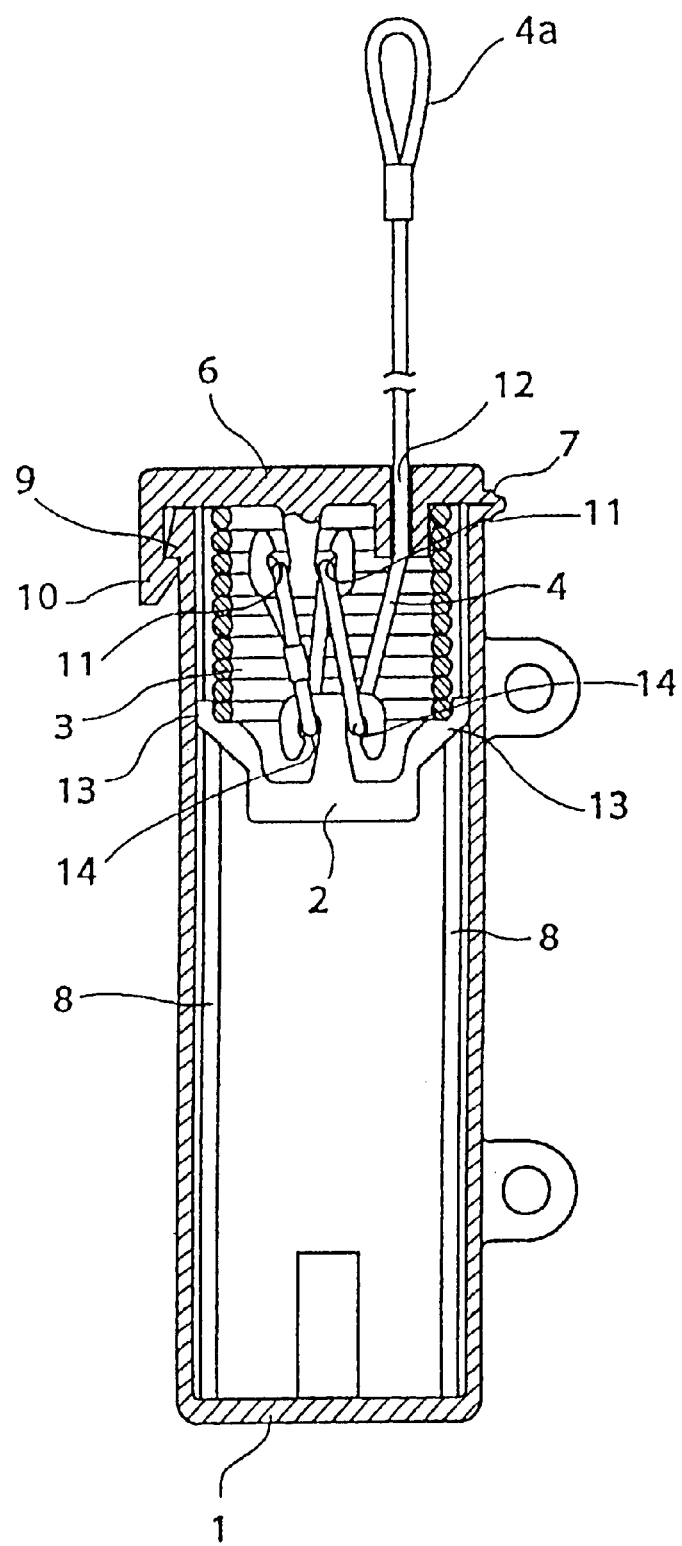
FIG. 11 is a cross section illustrating the state that the string assumes after it has been pulled out of the cylinder.

The one terminal part 4a of the string 4 passed through the through hole 12 of the cap 6 of the cylinder 1 and led out of the interior of the grommet G is fastened on the tailgate side of the hatchback car, though not specifically illustrated. When the tailgate of the hatchback car is then opened, the piston 2 is moved inside the cylinder 1 against the elastic urging force of the compression coil spring 3. In addition, the string 4 is fully pulled out of the cylinder 1 accordingly as the distance between the hooking part 11 of the cap 6 and the hooking part 14 of the piston 2 is narrowed. As a result, the compression coil spring 3 is brought into a tightly fastened state as shown in FIG. 11. The rear terminal part of the rear shelf S disposed in the rear receiving chamber is moved upward by the resultant tension of the string 4 to allow the baggage to be moved into and out of the rear receiving chamber.

Moreover, when the piston 1 moves inside the cylinder 1, the leading terminal parts of the pair of elastic arms 13 are moved as meshed with the corresponding oblong grooves 8. As a result, the string 4 is smoothly extracted with complete certainty because the piston 2 is infallibly prevented from rotating inside the cylinder 1 and the intervening portions of the string 4 hooked sequentially on the individual hooking parts 11 and 14 are not allowed to entangle. With respect to the cap 6 that closes the other terminal opening part of the cylinder 1, the through hole 12 through which the string 4 is pulled out is disposed at a position displaced from the center thereof. Therefore, it is possible to prevent the presence of the string 4 from causing any obstruction by attaching the string 4 so as to approximate closely to the rear shelf S when the cylinder 1 is fitted on the rear shelf S.

Figure 12:
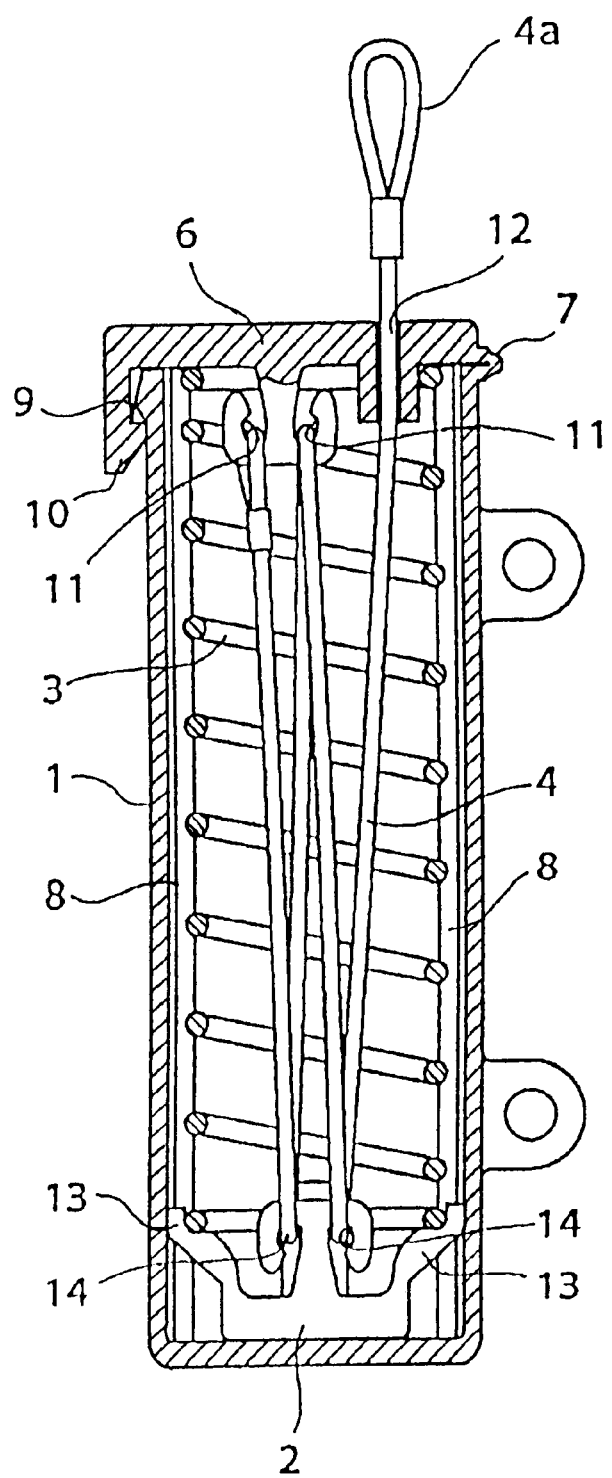
FIG. 12 is a cross section illustrating the state that the string assumes after it has been pulled into the interior of the cylinder.

Conversely, when the tailgate is closed, the rear shelf S moves downward under its own weight and resumes the original horizontal state. At this time, the piston 2 is moved in the reverse direction inside the cylinder 1 to widen the distance between the hooking parts 11 of the cap 6 and the hooking parts 14 of the piston 2 by the elastic urging force of the compression coil spring 3. This is shown in FIG. 12. The presence of the string 4 cannot cause any obstruction because the divergence of the hooking parts 11 and 14 causes the outwardly drawn string 4 to be pulled in automatically between the individual hooking pairs 11 and 14. Again in this case, the string 4 is smoothly pulled in without entangling because the piston 2 is prevented from being rotated inside the cylinder 1. Further, the emission of abnormal noise can be effectively prevented because the elastic arms 13 of the piston 2 slide in the oblong grooves 8.

In the pull-in device according to the first embodiment, the intervening points of the string 4 are sequentially folded back between the hooking parts 14 of the piston 2 and the hooking parts 11 of the cap 6 and hooked on the relevant hooking parts. Therefore, the string 4 can be given a far greater length as compared with the length of the cylinder 1, and the pull-in device itself can be miniaturized as contemplated. Particularly since the hooking parts 14 of the piston 2 are formed as mutually opposed across the center of the piston 2, the piston 2 is smoothly moved inside the cylinder 1 without any rattle with perfect certainty. Further, the fact that the cap 6 is integrally formed with the cylinder 1 results in decreasing the number of component parts of the device and lowering the cost of manufacture of the device as well.

Figure 13:
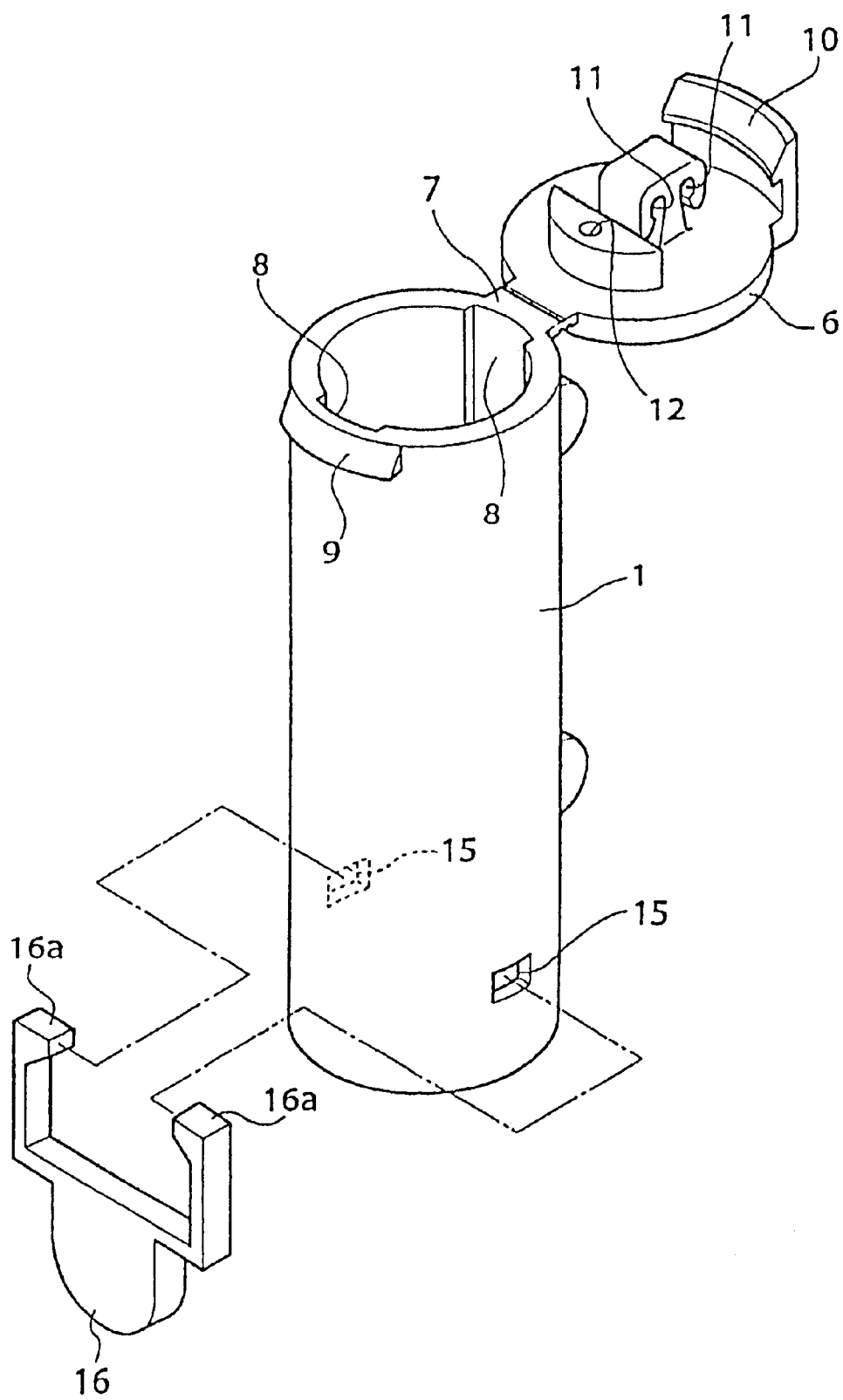
FIG. 13 is an exploded perspective view of the essential part illustrating a pull-in device for a string according to the second embodiment of this invention.

Next, the pull-in device according to the second embodiment will be described. The device of this second embodiment basically follows faithfully the first embodiment except for the following. In the formation of the spring seats of the compression coil spring 3 disposed on the one terminal part of the cylinder 1, as shown in FIG. 13, opposed insertion holes 15 are opened on the one terminal part side of the cylinder 1. Furthermore, a clip 16 having forked projections 16a adapted to be inserted into the individual insertion holes 15 is independently formed. During the initial assemblage, the individual projections 16a of the clip 16 are inserted into the corresponding insertion holes 15 and improvised as spring seats for supporting the terminals of the compression coil springs 3.

In the second embodiment, therefore, the forked projections 16a of the separately formed clip 16 are preparatorily inserted into the insertion holes 15 of the cylinder 1 until the projections 16a come to support the terminal of the compression coil spring 3. Thereafter, the piston 2 is driven into the cylinder 1 and the pair of elastic arms 13 are consequently bent and slipped through the inside of the compression coil spring 3. The result is that the pull-in device can be similarly assembled with ease because the sole removal of the clip 16 from the cylinder 1 suffices to lower the terminal of the compression coil spring 3 until it contacts the individual elastic arms 13 of the piston 2.

Figure 14A:
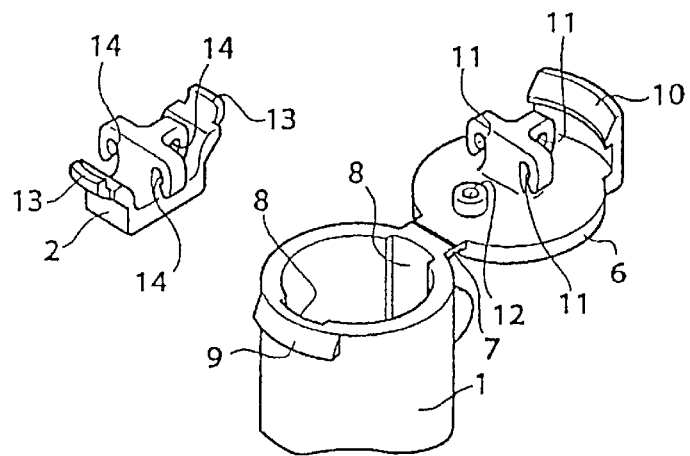
FIGS. 14(A), 14(B), and 14(C) are perspective views of the essential part illustrating other examples of hooking parts.
Figure 14B:
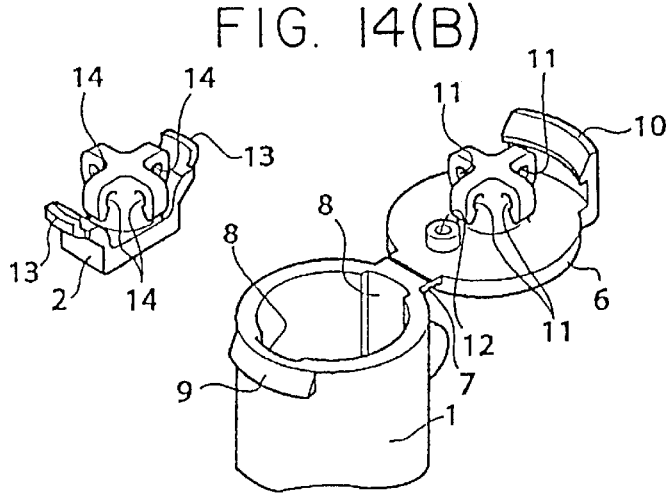
Figure 14C:
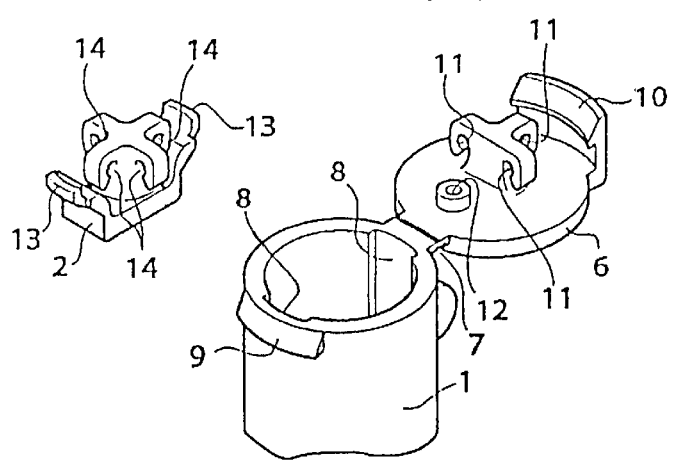

Incidentally, each of the modes of embodiment described above contemplates forming two hooking parts 11 and 14, respectively, on the cap 6 side and the piston 2 side and miniaturizing the device itself, including the cylinder 1. This invention does not need to be limited to such embodiments. It is possible to instead attain further miniaturization of the device including the cylinder, for example, by forming three hooking parts 11 and 14, respectively, on the cap 6 and the piston 2 as illustrated in FIG. 14(A). Otherwise, four hooking parts 11 and 14 are formed, respectively, on the cap 6 and the piston 2 as illustrated in FIG. 14(B). Another alternative is to form three hooking parts 11 on the cap 6 and four hooking parts 14 on the piston 2 as illustrated in FIG. 14(C). Further, in place of the compression coil spring 3, a tension coil spring is mounted between one terminal part of the cylinder 1 and the piston 2 and this tension coil spring may be utilized as an urging spring.

Finally, the pull-in device according to the third embodiment will be described. This third embodiment, unlike the first and second embodiments described above, is characterized by endowing the pull-in device itself with the function of a damper. To be specific, this damper function prevents the rear shelf S from vertically fluctuating as interlocked with the closing and opening motion of the tailgate. To attain this, the one terminal part 4a of the string 4 is designed so as to not be abruptly pulled into the cylinder 1 when the one terminal part 4a of the string 4 is removed from the tailgate.

Figure 15:
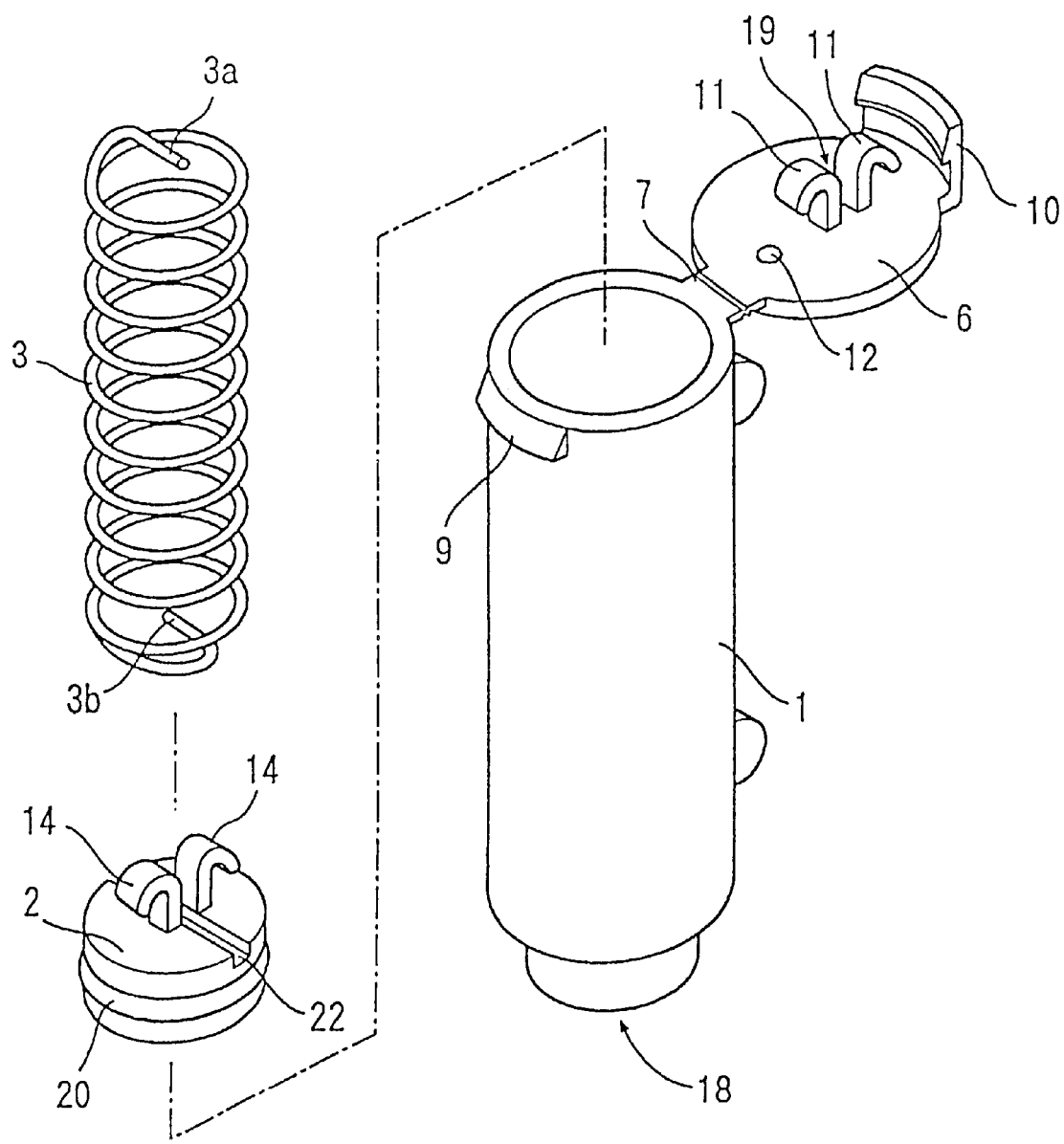
FIG. 15 is an exploded perspective view of the essential parts illustrating a pull-in device for a string according to the third embodiment of this invention.

Even in the third embodiment, the cap 6 that has the engaging claw 10, the two hooking parts 11 and the through hole 12 is connected through the thin-wall hinge 7 to the other terminal opening part of the cylinder 1 as illustrated in FIG. 15. However, no spring seat is set up on the one terminal part. In addition, a sealed chamber 17 is defined between the one terminal part of the cylinder 1 and the piston 2, and a valve mechanism 18 for regulating the amount of air passed to the interior of the sealed chamber 17 is set up on the one terminal part.

Incidentally, a groove 19 into which one of the terminal parts 3a bent in the direction of the center of the coil of the compression coil spring 3 is inserted is formed between the individual hooking parts 11 of the cap 6. The through hole 12 is given a flared shape for the purpose of improving the guide of the string 4 therethrough.

The piston 2 is formed wholly in the shape of a disc and provided on the outer periphery thereof with an O ring 20 and between the individual hooking parts 14 with a groove 22 furnished with an orifice 21. Thus, the groove 22 permits the other terminal part 3b bent in the direction of center of the coil of the compression coil spring 3 to be inserted therein.

Figure 16A:
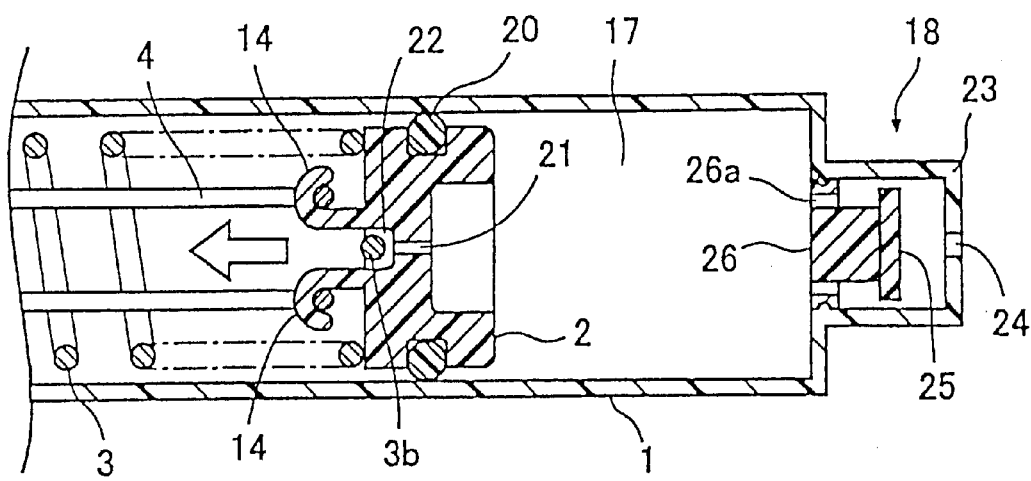
FIG. 16(A) is a cross section of the essential parts illustrating the state that a valve mechanism assumes when it is opened and FIG. 16(B) is a cross section of the essential parts illustrating the state that the valve mechanism assumes when it is closed.
Figure 16B:
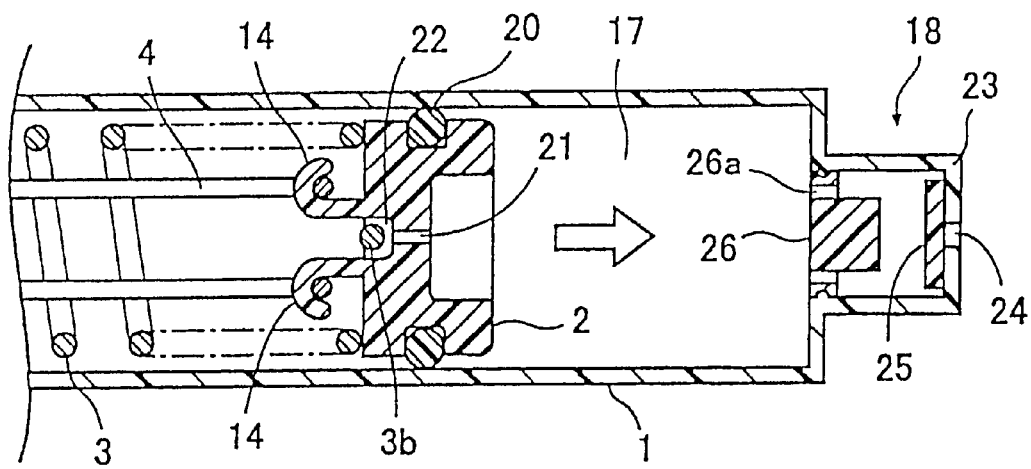

The valve mechanism 18 disposed on the one terminal part of the cylinder 1, as illustrated in FIG. 16, forms on the one terminal part side of the cylinder 1, a valve chamber 23 furnished with an opening 24. A sheet valve 25 adapted to open or close the opening 24 is disposed in the valve chamber 23. A stopper 26 furnished with an air passage 26a is disposed in the boundary between the valve chamber 23 and the cylinder 1. With this configuration, when the piston 2 moves in the direction of the other terminal opening part of the cylinder 1, the sheet valve 25 consequently exposes the opening 24 of the valve chamber 23 as illustrated in FIG. 16(A). As a result, the flow of air into the sealed chamber 17 is attained via the gap formed between the peripheral surface of the sheet valve 25 and the valve chamber 23 and via the passage 26a of the stopper 26. When the piston 2 inversely moves in the direction of the one terminal part of the cylinder 1, however, the sheet valve 25 blocks the opening 24 of the valve chamber 23 as illustrated in FIG. 16(B) to restrict the flow of air into the sealed chamber 17.

Figure 17:
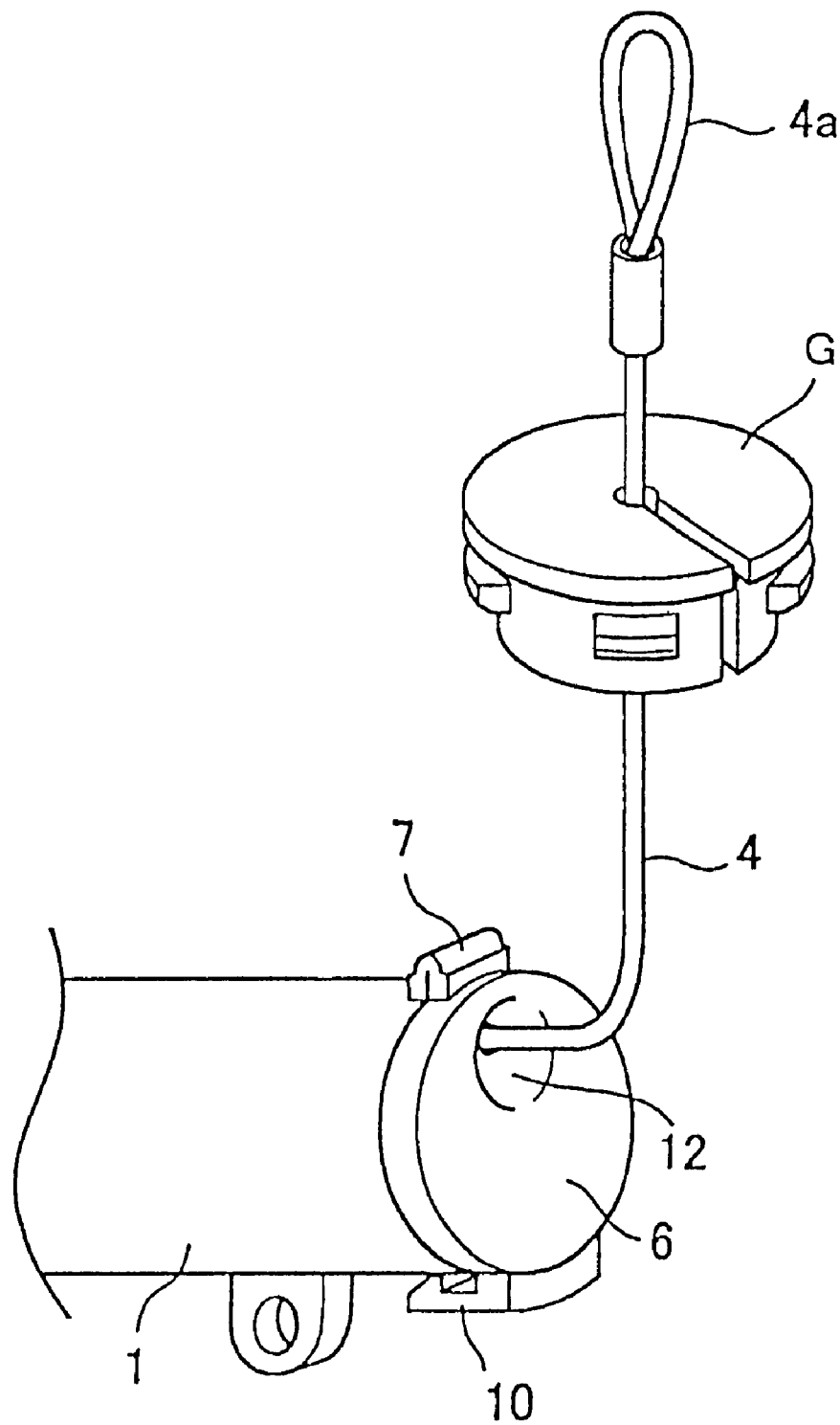
FIG. 17 is a perspective view of the essential parts illustrating the state that the string assumes when the grommet is mounted on one end part side thereof

Even in the pull-in device thus constructed, the one terminal part 4a of the string 4 is pulled out of the cylinder 1 to a certain extent. Consequently, the grommet G fastened to the fitting hole of the rear shelf S is fitted on the one terminal part 4a of the string 4 as illustrated in FIG. 17. Then, the cylinder 1 is fixed to the opposite sides of the rear surface of the rear shelf S. The one terminal part 4a of the string 4 passed through the through hole 12 of the cap 6 of the cylinder 1 and led out of the interior of the grommet G is fastened to the tailgate of the hatchback car. In this state, the tailgate of the hatchback car is opened. As a result, the string 4 is sufficiently pulled out of the cylinder 1 and the compression coil spring 3 is made to assume a tightly attached state. These are attained as the piston 2 moves inside the cylinder 1 against the elastic urging force of the compression coil spring 3 and the distance between the hooking parts 11 of the cap 6 and the hooking parts 14 of the piston 2 narrows. Consequently, the rear terminal part of the rear shelf S disposed in the receiving chamber on the rear side comes to be moved upwardly by the resultant tensile force of the string 4.

In this case, the sheet valve 25 in the valve chamber 23 is moved in the direction of exposing the opening 24 of the valve chamber 23 with the movement of the piston 2. The flow of air into the sealed chamber 17 is obtained via the gap formed between the peripheral surface of the sheet valve 25 and the valve chamber 23 and via the passage 26a of the stopper 26. In the present third embodiment, similar to the first and second embodiments, no effect of a damper is obtained because the piston 2 is moved against only the pressure of the compression coil spring 3.

When, in the ensuant state, the rear shelf S is not required to be vertically reciprocated as interlocked with the tailgate, however, the one terminal part 4a of the string 4 comes to be removed from the tailgate this time. When the one terminal part 4a of the string 4 is simply removed, the one terminal part 4a of the string 4 is abruptly pulled into the cylinder 1 in a rattling manner. The rattling motion of the one terminal part 4a of the string 4 comes to fracture the grommet G and inflict damage on the interior parts.

In the third embodiment, therefore, when the one terminal part 4a of the string 4 is removed from the tailgate to be pulled in abruptly, the seal valve 25 this time blocks the opening 24 of the valve chamber 23 with the movement of the piston 2. Consequently, the flow of air into the sealed chamber 17 is obtained via the orifice 21. As a result, the effect of a damper is obtained and the piston 2 is gradually moved inside the cylinder 1 and the string 4 is effectively prevented from being abruptly pulled in. The diameter of the orifice 21 is preferably set so as to restrict the maximum speed with which the string 4 is pulled in to below 1.6 m/sec.

Furthermore, the third embodiment adopts a construction in which the grooves 22 and 19 are formed on the piston 2 and the cap 6 integrally formed with the cylinder 1, respectively, and the bent terminal parts 3b and 3a of the compression coil spring 3 are inserted therein. Therefore, it infallibly prevents the piston 2 to be rotated within the cylinder 1 and also prevents the string 4 sequentially hooked on the hooking parts 11 and 14 from entangling in the same manner as in the first embodiment.

Figure 18A:
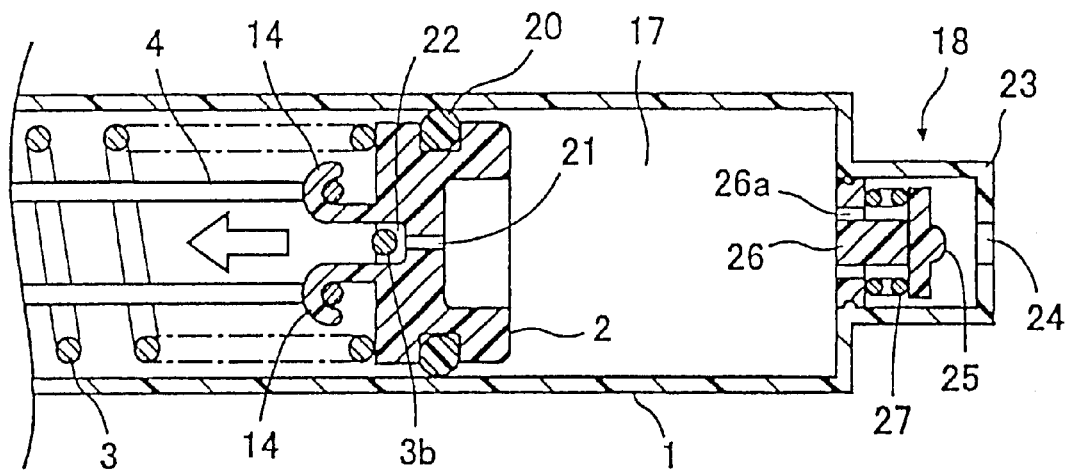
FIG. 18(A) is a cross section of the essential parts illustrating another example of the valve mechanism in an opened state and FIG. 18(B) is a cross section of the essential parts illustrating the example of the valve mechanism in a closed state.
Figure 18B:
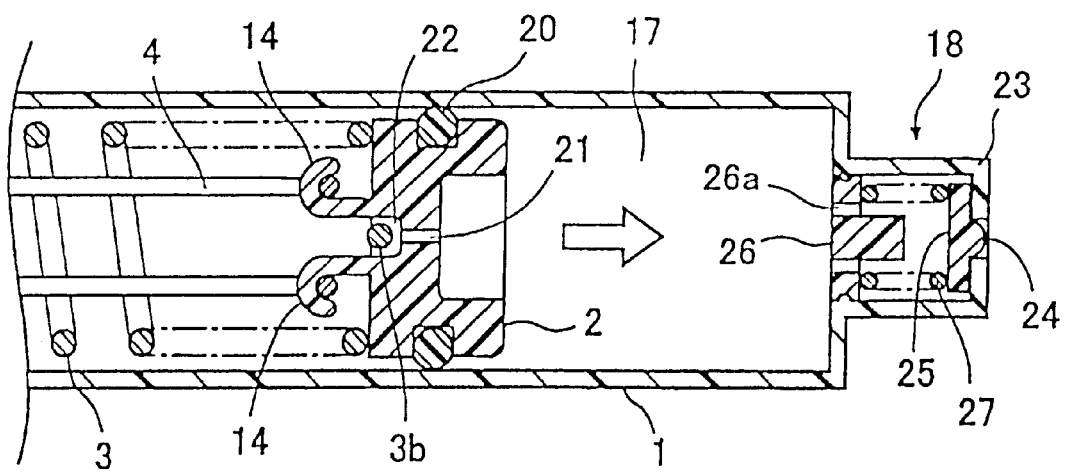

Incidentally, the valve mechanism 18 does not need to be limited to the structure described above. Arbitrarily, a coil spring 27 capable of constantly urging the sheet valve 25 in the direction of blocking the opening 24 of the valve chamber 23 may be interposed between the sheet valve 25 and the stopper 26 as illustrated in FIG. 18. The opening 24 of the valve chamber 23 will be consequently blocked with the movement of the piston 2.

Industrial Applicability

In the pull-in device for a string according to this invention as described above, the intervening points of the string are slidably hooked between the hooking parts of the piston and the hooking parts of the cap and sequentially folded back therebetween. Therefore, the string can be permitted to acquire a far greater length than the length of the cylinder and enable the pull-in device itself to be miniaturized to a great extent. Further, particularly since the hooking parts of the piston are formed as mutually opposed across the center of the piston, the piston can smoothly move inside the cylinder without any rattle.

Furthermore, the string hooked on the piston can be prevented from entangling within the cylinder by the rotation-preventing means rotation-preventing disposed between the cylinder and the piston. The piston is capable of elastically deforming and slipping past the inside of the urging spring. If the urging spring is inserted inside the cylinder and the piston is permitted to slip therethrough during the assemblage of the device, the piston is enabled to find its way to below the spring seat of the urging spring disposed on the one terminal part of the cylinder. The pull-in device, therefore, enjoys excellence of overall ease with which the device is assembled.

The pull-in device for a string according to this invention endows the device itself with the function of a damper. While the string is being freely pulled in, the possibility of the string being abruptly pulled in with a rattling motion is eliminated. In addition, the greatest speed with which the one terminal part of the string is to be freely pulled in is restricted to be below 1.6 m/sec. Therefore, the braking force is exerted on the speed with which the string is pulled in and the possibility of the string being pulled in at an unduly high speed is eliminated.

Further, the string can be prevented infallibly from entangling because the piston is prevented from rotating within the cylinder owing to the presence of the rotation-preventing means.

What is claimed is:

1. A pull-in device for a string, said pull-in device comprising:
   a tubular cylinder having a cap adapted to close a terminal opening part of said tubular cylinder, said cap having a hooking part formed thereon, said hooking part being adapted to slidably hook the string;
   a piston adapted to move inside said tubular cylinder, said piston having a plurality of hooking parts formed mutually opposed across a center of said piston, each of said plurality of hooking parts being adapted to slidable hook the string; and
   an urging spring adapted to elastically urge said piston inside of said tubular cylinder in a direction of a terminal part of said tubular cylinder opposite said terminal opening part,
   wherein intervening parts of the string are hooked serially in a back and forth fashion on said plurality of hooking parts of said piston and said hooking part of said cap, a first terminal part of the string is fixed to one of said tubular cylinder and said piston, and a second terminal part of the string passes outside of said tubular cylinder, such that the string is pulled into or out from said pull-in device depending on a direction of movement of said piston.

2. A pull-in device according to claim 1, further comprising rotation-prevention means for preventing said piston from rotating in said tubular cylinder is located between said tubular cylinder and said piston.

3. A pull-in device according to claim 2, wherein said piston is adapted to elastically deform and slip through an inside of said urging spring and force its way under a spring seat of said urging spring on said terminal part of said tubular cylinder.

4. A pull-in device according to claim 1, wherein said piston is adapted to elastically deform and slip through an inside of said urging spring and force its way under a spring seat of said urging spring on said terminal part of said tubular cylinder.

5. A pull-in device according to claim 1, wherein a sealed chamber is formed between said terminal part of said tubular cylinder and said piston, and said tubular cylinder has a valve adapted to admit an inflow of air when said piston moves in a direction towards said terminal opening part and regulate an outflow of air when said piston moves in the direction of said terminal part of said tubular cylinder.

6. A pull-in device according to claim 5, wherein said piston has an orifice such that when the second terminal part of the string is pulled into said tubular cylinder, a greatest speed in which the string is pulled in is restricted to below 1.6 m/sec.

7. A pull-in device according to claim 6, further comprising first rotation-preventing means for preventing rotation provided on a first terminal part of said urging spring and second rotation-preventing means for preventing rotation provided on a second terminal part of said urging spring.

8. A pull-in device according to claim 6, wherein said cap has a groove located therein, said piston has a groove located therein, and said urging spring has a first terminal part and a second terminal part, said first terminal part of said urging spring being fitted in said groove in said piston and said second terminal part of said urging spring being fitted in said groove in said cap, thereby preventing said piston from rotating in said tubular cylinder.

9. A pull-in device according to claim 5, further comprising first rotation-preventing means for preventing rotation provided on a first terminal part of said urging spring and second rotation-preventing means for preventing rotation provided on a second terminal part of said urging spring.

10. A pull-in device according to claim 5, wherein said cap has a groove located therein, said piston has a groove located therein, and said urging spring has a first terminal part and a second terminal part, said first terminal part of said urging spring being fitted in said groove in said piston and said second terminal part of said urging spring being fitted in said groove in said cap, thereby preventing said piston from rotating in said tubular cylinder.

11. A pull-in device according to claim 1, wherein said tubular cylinder has a plurality of oblong grooves located along an inner length thereof, and said piston has a plurality of elastic arms adapted to slide along said plurality of oblong grooves, thereby preventing said piston from rotating in said tubular cylinder.

* * * * *